July 16, 1935.  A. MOLANDER  2,008,221
SQUEEGEE
Filed Aug. 18, 1933
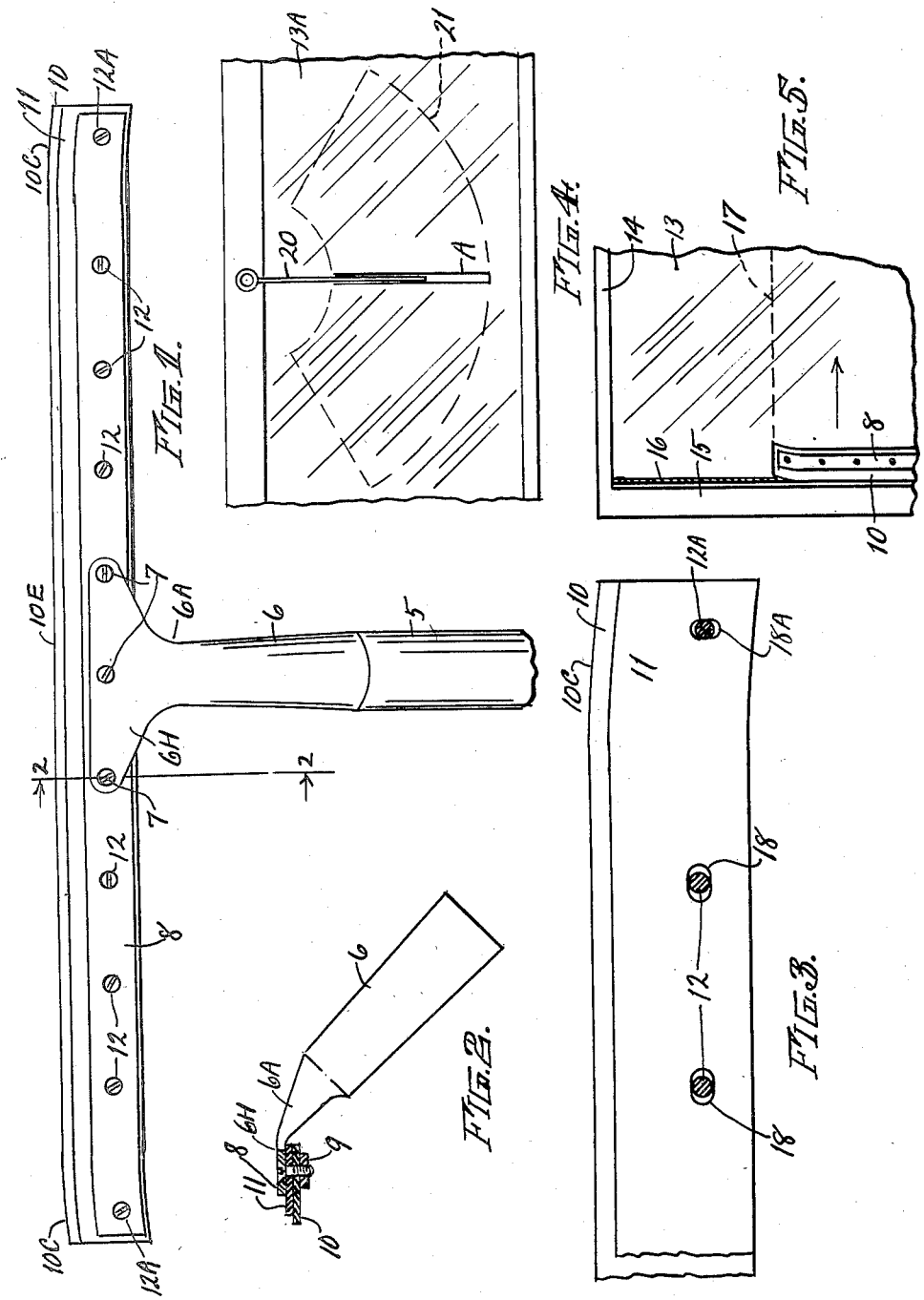
INVENTOR:
Alfred Molander.
BY David E. Carlsen.
ATTORNEY.

Patented July 16, 1935

2,008,221

UNITED STATES PATENT OFFICE 2,008,221

SQUEEGEE

Alfred Molander, St. Paul, Minn.

Application August 18, 1933, Serial No. 685,706

1 Claim. (Cl. 15—245)

My invention relates to improvements in squeegees used ordinarily in the cleaning of windows and secondarily door glass and the principle of my device may be embodied in other devices to advantage as on mechanical windshield wipers for automobiles.

The main object is to provide a device of the type described, embodying certain features which eliminate streaks or lines on a glass surface, providing in shortest possible time a clear, unmarked glass surface, all as hereinafter fully set forth, reference being had to the acccompanying drawing, in which:—

Fig. 1 is a plan view of a squeegee of the usual type used for cleaning windows and embodying my improvements, only a portion of the handle being shown.

Fig. 2 is a detail sectional view as on line 2—2 in Fig. 1.

Fig. 3 is an approximately full size face view of one end part of a squeegee wiper blade of my improved type.

Fig. 4 is a front elevation of my device used as a windshield wiper on an automobile.

Fig. 5 is a face view of a portion of a window and showing my device in operative position.

Referring to the drawing by reference numerals, 5 designates the usual handle of any desired length, the front end of same being insertable in and retained in the shank 6 of the squeegee. Said shank is usually flattened at 6A and bent to its integral T-head part 6H which latter part is suitably removably attached as at 7 to the central part of the upper metal wiper clamp-bar 8.

Said bar 8 is as stated the upper clamp bar, there being also a similar lower clamp bar 9 between which bars are clamped the rubber wiping means which comprise a main rubber strip 10 and an auxiliary strip or blade 11 atop thereof.

The rubber strips are preferably clamped between the bars by a series of flat-head screws 12 insertable in apertures of the upper bar 8, through registering apertures 18 in the rubber strips and threaded into corresponding apertures in the lower bar 9.

The auxiliary rubber strip 11 is of course a reenforcing strip and its forward edge offset back from the forward edge of the main strip or blade which latter edge is the glass contact edge.

The main features of my device are embodied in the said rubber strips and the metal clamping bars retaining said strips rigidly between them and in parallel relation to each other.

Hitherto the rubber strips and the clamps therefor, as far as I am aware, have been made straight throughout their entire length. In my device the opposite ends or extremities of said parts are curved rearwardly, as distinctly shown at 10C in Figs. 1 and 3 for a purpose presently to be described.

The use of my device is similar to use of present types of squeegees, horizontal, vertical and irregular strokes of the device being made on the glass, each stroke overlapping the area contacted by previous strokes. However, hitherto much difficulty has been experienced to get a glass surface absolutely clear, streaks becoming evident when the surface dries such streaks being difficult to see during the cleaning process. One example of this is illustrated in Fig. 5 in which view is also shown how my device eliminates the streaks on the glass.

For example (in Fig. 5), assuming that the window glass 15 has been washed with water and any cleansing solution therein and that the squeegee has made one horizontal stroke to remove the water under the top member 14 of the window, as from the left sash member 15 toward the right. It is often the case that a little of the water is remaining in the vertical groove where glass 13 and bar 15 converge such wet streak being designated by shaded area 16 and said water naturally running down along the groove.

With a square end wiper it is clear that when the wiper is drawn as from left to right in Fig. 5 a part of the descending water 16 unavoidably must be drawn out as line 17 and making a streak on the glass. Under the same conditions with the arcuate end part of my wiper blade there is no angular corner to catch any of water 16 and cause a streak. It is true that my blade does contact the glass and said water 16 but because of said arcuate construction there is a gradual approach of said arcuate face to the glass surface and consequently when the wiper is drawn across the glass there can be no sharp line of demarcation, as 17. Obviously because of said gradual contact there must be made a streak across the glass but said contact spreads any such water in a left to right streak which is relatively wide and thin and not visible. Therefore the gradual receding of said curved blade part is definitely different than a right angle contact on the glass.

Fig. 1 clearly reveals that the wiper members 10—11 and the clamp bars are correspondingly curved rearwardly at their respective ends and it is obvious that the end screws 12A may be out of alinement with the other screws 12 because of the said curvatures. In Fig. 3 is shown that the wiper members 10—11 are made with horizontally elongated slots 18 for the clamping screws 12 to pass through, and the end screws 12A pass through transversely elongated slots 18A, said slots 18 providing for holding the straight parts in suitably taut and straight condition for efficient wiping contact and the slots 18A provide for holding the end parts in suitably rearwardly curved condition with the outer corners suitably spaced out of alinement with the straight wiping edge. Obviously the straight edge 10E is tangential to the receding end parts 10C of the blade.

The wiper members 10—11 are preferably of molded rubber, but if cut from sheet stock are made with identical forward and rear edge curves thus eliminating waste in manufacture and providing blades of correct configuration, the curved ends being subject to forward or rearward adjustment as may be deemed necessary by the user and allowed for by the transversely elongated slots 18A.

In Fig. 4 the glass 13A designates an automobile windshield, A designating my wiper contacting the glass and instead of a handle as in Fig. 1 has the reciprocable arm 20 of a mechanical windshield wiper clearing an arcuate area designated by broken outlines 21. The arcuate upper and lower lines 21 are eliminated by the use of my wiper blade for the same reasons line 17 (Fig. 5) is made invisible as described in first paragraph of page 3. In present types of windshield wiper blades, with square ends, the contact of said latter parts causes arcuate streaks on the glass such streaks being not only unsightly but difficult to remove.

The main feature of my squeegee comprises the molded mainly straight edged rubber contact strip with the receding curved end parts, the degree of such curvature being necessarily only very slight. The said curvature may be varied as desired within certain limits without affecting the straight edge and is retained by the screws 18. The outermost corners, where the wiping edges and end edges of the blade converge are almost rectangular and being retracted, in any case, only slightly from the glass surface these corner parts serve as guides against the sash bars 14—15.

An important feature is that the curvature 10C is molded or formed in the manufacture of the blade. A straight edge blade cannot be pressed or forced back into such curvature without affecting the straight edge part of the blade, causing undulation or waves therein and renders the wiping edge useless. The degree of curvature of the blade at 10C is only variable slightly to conform to variable pressure exerted by different operators some having only a normal light working pressure, others more or less heavy handed. In any case the blade must be adjusted according to the usual pressure exerted by the operator and the curvature 10C is variable of course in accordance therewith.

The metal head described is of secondary importance. It is obvious that my flexible blade is adaptable for use with present well known squeegee clamp means.

I claim:

A squeegee wiper member comprising a flexible blade adapted to be clamped between a pair of parallel clamp bars and projecting forwardly thereof, the blade having a straight, forward edge throughout its main length and gradually receding rearwardly at its end parts, the blade means and the clamping bars provided with a series of registering apertures, the apertures of the clamp means suitably threaded for clamping screws and the extreme end apertures only of the flexible blade means elongated transversely of the blade and clamp bars and the intermediate apertures formed elongated longitudinally of the blade.

ALFRED MOLANDER.